(12) United States Patent
Pellenc

(10) Patent No.: US 7,652,766 B2
(45) Date of Patent: Jan. 26, 2010

(54) METHOD AND DEVICE FOR ANALYSIS OF THE STRUCTURE AND THE COMPOSITION OF CULTURED HEDGES SUCH AS FOR EXAMPLE ROWS OF VINES

(75) Inventor: Roger Pellenc, Pertuis (FR)

(73) Assignee: PELLENC Societe Anonyme, Pertuis (FR)

( * ) Notice: Subject to any disclaimer, the term of this patent is extended or adjusted under 35 U.S.C. 154(b) by 622 days.

(21) Appl. No.: 10/551,534

(22) PCT Filed: Mar. 23, 2004

(86) PCT No.: PCT/FR2004/000714

§ 371 (c)(1),
(2), (4) Date: May 19, 2006

(87) PCT Pub. No.: WO2004/089063

PCT Pub. Date: Oct. 21, 2004

(65) Prior Publication Data

US 2006/0272201 A1     Dec. 7, 2006

(30) Foreign Application Priority Data

Mar. 31, 2003   (FR) .................................. 03 03944

(51) Int. Cl.
*G01N 21/00* (2006.01)

(52) U.S. Cl. .................. 356/432; 356/435; 56/16.7; 56/233

(58) Field of Classification Search ................. 356/432; 56/16.7, 233
See application file for complete search history.

(56) References Cited

U.S. PATENT DOCUMENTS

| 2,762,186 | A | * | 9/1956 | Janata ...................... 56/233 |
| 3,597,908 | A | * | 8/1971 | Schaefer et al. ............. 56/233 |
| 4,383,401 | A | * | 5/1983 | Lessard et al. .............. 56/236 |
| 5,544,444 | A | * | 8/1996 | Oldridge ...................... 47/4 |
| 6,009,695 | A | * | 1/2000 | Karas ........................ 56/237 |

FOREIGN PATENT DOCUMENTS

EP          974262 A1 *  1/2000

* cited by examiner

*Primary Examiner*—Roy Punnoose
(74) *Attorney, Agent, or Firm*—Egbert Law Offices PLLC

(57) ABSTRACT

The method for analyzing the structure of cultured hedges, equally applicable by day or by night, for a mobile, continuously-moving machine in tied or staked plantations such as vineyards, includes a system using an artificial vision system, working by transmission, which permits a detection of the shadowing of the light between one or more transmitters and one or more detectors to one side and the other of the hedge. The information generated by said shadows of light are processed by an electronic analysis system, programmed or embodied to examine the elements of the structure of the hedge.

17 Claims, 11 Drawing Sheets

METHOD AND DEVICE FOR ANALYSIS OF THE STRUCTURE AND THE COMPOSITION OF CULTURED HEDGES SUCH AS FOR EXAMPLE ROWS OF VINES

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention involves a process and a device for analysis of the structure and constitution of cultivated trained and staked hedgerows such as, for example, rows of vines, or other fruit-bearing bushes, fruit trees, vegetables cultivated in rows (tomatoes, beans, etc.).

This process and device are most especially designed for the implementation and equipping of mobile machines designed for continuous work in trained and/or staked plantations, such as vineyards.

The invention also embodies machines, and most specifically, agricultural machines that involve the application and include this process and device.

BACKGROUND OF THE INVENTION

The analysis of the structure of cultivated or fruit-bearing hedgerows obtained by implementing the process and device of the invention can be used in order to optimize the results of different mechanical or manual inventions to be performed on these hedgerows, whether simultaneously during or subsequent to examining their structure.

The invention can be advantageously applied to the equipment of agricultural machines designed and used for the preliminary pruning of trained and/or staked vines, but it is emphasized and understood in reading the following description that the invention can be implemented to equip other types of agricultural machines such as machines for cultivating the soil, machines for treating plants, harvesting machines, etc. For this reason, reference to a preliminary pruning (or pre-pruning) machine, in the following description, would not be restrictive.

It is recalled that the purpose of the mechanical pre-pruning of the vine is to simplify later pruning work by eliminating the maximum amount of wood before manual pruning. During this preparatory mechanical operation, the wood or vine-shoots whose tendrils are fixed to the wires of the paling, are cut off and released. The main problems of this work consist in:

ensuring passage by the paling of the stakes which create an obstacle to the movement of the cutting instruments, the restriction being that the action of the machine must not be destructive with regard to the stakes and the wires of the paling or its own cutting instruments;

for vines trained with cordons, not damaging the cordons, and notably not cutting off any of the fruit.

Most modern pre-pruning machines use rotary cutting systems. Machines with cutting bars are less widespread because disengaging them in order to pass by the stakes can not be done as quickly.

According to the most modern type of machines equipped with rotary cutting systems, the cutting off of the wood is ensured by at least one column of shredding wheels comprising an open circular guide whose periphery forms fingers. Inside the wheels, fixed blades (EP-0 312 126) or a circular saw (FR-2.576.481) ensure that the wood is cut off, acting in combination with the fingers. The cutting tools thus comprised are stacked on two vertical shafts placed on either side of the paling axis during the pre-pruning operation. The rotary instruments acting together for the cutting action are arranged in alternate rows and slightly crossing each other during work; the lower wheel of each paling can be comprised of a pruning shearing wheel for better finishing.

At the entrance to a row of vine stocks, as well as at the exit from this row, the wheel columns are moved out so as to not cut the abutment wires. These paling wires must be correctly installed so as to not become caught or cut off while the machine is operating on the row.

For the passage of stakes having an appropriate diameter, often made of wood or concrete, the wheels roll on the stakes and move away from them automatically, the pressure on the stakes being adjustable so that matching a sizeable density of vine-shoots does not cause an undesired opening of the cutting head; on the contrary, the force for the passage of the stakes must not be excessive so as to not risk damaging them.

However, when the stakes are comprised of steel profiles having a small cross-section, for example, 30 mm angle irons, the spacing between the pilings and the cutting head to allow for the passage of the stakes must be made manually since the stakes can seriously damage the cutting tools by penetrating into the fingers of the rotary guides. In such a situation, the wine growers prefer, in the majority of cases, to use pre-pruning machines with manually controlled opening which requires that the drivers of these machines be vigilant at all times. Very often, to not take any risks, the drivers prefer to open and close the cutting head at a distance from the stakes with a large safety margin, which has the disadvantage of leaving a sizeable quantity of the wood uncut.

When the vines are cordon-cultivated (cordon de Royat), for example, an advantageous application of the invention is to make it possible to keep the pre-pruning cutting instruments above and at a suitable distance from the cordon, in order to remove any risk of damage to the cordon and prevent the elimination of the fruit that is intended to be protected, while keeping the wood pruned as small as possible.

In fact, if it is possible to adjust the height of the cutting instruments of the machine, at the entrance to a row, their position relative to the cordon can be modified when they are moved on this row due to unevenness in the ground, in a manner so that in case of a sudden drop resulting from the passage of the machine into a cavity in the ground, the cordon can be damaged or robbed of its fruits.

Another interesting application of the invention is to perform a measurement of the speed of advancement of the machine, in a manner so as to make possible a permanent adaptation of the functioning conditions of the tools from the measurement of the speed of movement.

In fact, if you consider the pre-pruning machines of the type mentioned above, the peripheral speed of the wheels must be adapted to the speed of movement, an excessive speed of rotation of the wheels has the effect of pulling the wood to the back, whereas a very low speed of the wheels results in pushing the vegetation to the front. The adaptation of the speed of rotation of the wheels to the speed of movement of the machine can be obtained using a speed setting. In practice, the wine-grower chooses an operating speed and adjusts the setting as a result before entering the vine, so that if this speed changes along the way, the cutting instruments will not always work in the best conditions, which causes breakage of the wood, and sometimes, uprooting of the base of the vine.

Another advantage use of the analysis of the structure of the rows of the wines is to allow a setting for the health status of the wine plants.

Wine growing is developing towards a concept of "Precision Wine Growing" (Trademark) which involves noticing, using sensors, all of the significant characteristics of the plant making it possible to consider these characteristics on a GPS map, with regard to short and long-term optimization of the harvest.

The base characteristics of the vine which are essentially the quantity of grapes harvested, the sugar of the grapes, their acidity and the health status of the plant, are collected in a database that is conventionally called "wine base information" and then used to define the conditions in which the pruning, the fertilization, and the selection of the grapes for better vinification, etc.

Knowing the health status of each plant is a data that is of interest to every winegrower who wants to improve the quality of his product. In fact, the map of the vine is developed among other things as a function of the fertilization and the nature of the ground. This development is expressed by the growth, during the vegetative period, of vine-shoots which lose their leaves the following winter.

The health status of the vine is measured when it is pruned; the pruned vine-shoots are recovered, cut into small pieces and weighed. The weight of these vine-shoots will represent the characteristic of health status. It is obtained by comparing the vine-bases, one relative to the other, in comparing deficient health status to good health status. It is known that each health status must correspond to a certain quantity of grapes produced by the plant.

The pruning of the vine has the function of allowing on each vinestock a certain number of buds, which, in the context of their development, will make it possible to determine the volume of the harvest. It is known, for example, that the vine must have an average of 28,000 buds per hectare after the pruning operation. Currently, 28,000 buds/hectare is divided by the number of feet/hectare, which determines uniformly for each vine base, the number of fruit to be looked after per vine base.

Knowing that in a parcel of land, taking into account the heterogeneity of the ground and the conditions of exposure, the health status is not uniform, there is reason, in modern wine-growing, to divide up the 28,000 fruit/hectare not uniformly but as a function of the health status of the vine base.

The measurements made in the context of precision wine-growing must make it possible to measure the health status of each vine base in a manner so as to assign to it an appropriate number of fruit. It is thus necessary to evaluate this health status per vine base in an automated manner because it is unthinkable to perform the operation of weighing the wood for each vine base.

In the document EP-0.974.262, an automated pruning device for plants such as wine plants is described, comprising a chassis supporting a pruning device, a device for acquisition of images making it possible to record the position of the plant relative to the pruning device, and a treatment unit planned in order to send control signals for the adjustment of the position of the pruning device as a function of the images recorded from the trunk or main branch of the plant relative to the pruning device. The device for acquisition of images is comprised of a pair of television cameras placed in a manner so as to be able to point towards the skin, with one at an angle relative to the other.

The automated pruning device described in this document implements a system for image acquisition (television) which does not function without lighting (daylight or substitute lighting) and which functions poorly under strong lighting (the result, for example, of a strong sun) requiring the use of a screen. It does not function during the night without implementing lighting to substitute for the sun.

It does not appear that an automated pruning device according to the document EP-0.974.262 has been put on the market, so that to the knowledge of the applicant, in the domain of agricultural machines, there are not known to exist any processes and devices capable of making, both during the day and the night, analyses of the structure of fruit-bearing hedgerows such as vine rows, and of applying the resulting information of these analyses:

in order to obtain the automatic opening of the cutting head of the pre-pruning machines moving by stepping over the vine row, for passage of the stakes, when they are made of angle irons or have a reduced diameter that allows them to penetrate into the fingers of the shredding wheels; for constant adaptation to the speed of rotation of the wheels to the speed of movement of the machine;

with respect to the integrity of the cordon and the fruits to be protected, for cordon-trained vines;—for the measurement of the health status of the vine.

On the other hand, the necessity to proceed with a manual opening of the cutting head for passage of the stakes does not make it possible to perform work at high speed with the current machines. In fact, either the opening of the cutting head is delayed as much as possible in order to cut off the greatest quantity of vineshoots possible, and, in this case, the cutting head comes to hit the stakes causing the stakes to progressively recede, or the opening of the cutting head is anticipated, and, in this case, a sizeable quantity of vegetation is left on the vinestocks next to the stakes.

The present invention proposes to correct the deficiencies mentioned above.

BRIEF SUMMARY OF THE INVENTION

According to the invention, the analysis of the structure of the cultivated hedgerows such as, for example, rows of vines or other fruit rows is obtained using a process according to which is arranged, preferably in front of the working head of the mobile machine designed for continuous work in trained and/or staked plantations, a system for artificial vision functioning by direct transmission and configured in order to make it possible to determine when the light has been blocked between one or more transmitters and one or more receptors placed facing each other on either side of the hedgerow, and in that the information generated by the blockages of the light are treated by an electronic system for analysis programmed or configured in order to analyze the elements of the structure of the hedgerow, and this is to be done both in the day and the night.

According to an interesting implementation of the process, freedom from the influence of interfering solar light is achieved by an artificial illumination system in using a light periodically modulated by the emitters, the receivers only being sensitive to the modulated light and not to the continuous component of the light.

According to another interesting implementation of the process, the significance of the interfering light is reduced by selecting emission and reception wavelengths for which the solar light is relatively weak, i.e. outside of the visible spectrum, either a wavelength of light at 400 nm or greater than 750 nm, and, for example, a wavelength on the order of 950 nm, for which the solar radiation received is particularly weak.

According to another characteristic arrangement of the process of the invention, the electronic analysis system is programmed or configured in order to handle the information generated by the blockages of light, in order to measure the speed of movement of the machine and to adjust the rotational speed of the rotary tools of the machine as a function of the measured speed of movement.

According to another characteristic arrangement of the process of the invention, the electronic analysis system is programmed or configured in order to handle the information generated by the blockage of light, in order to detect the stakes of the hedgerow.

According to another characteristic arrangement of the process of the invention, the electronic analysis system is programmed or configured in order to handle the information generated by the blockage of light, in order to detect the position of the cordon in the vines or other cordon-trained plants.

According to another characteristic arrangement of the process of the invention, the electronic analysis system is programmed or configured in order to use the information generated by the blockage of light, in order to measure the health status of the plants.

The device for analysis of the structure of the fruit-bearing hedgerows according to the invention comprises a system for artificial vision functioning by direct transmission, comprised of one or more emitters and one or more receivers, this system for artificial vision being arranged in such a way that when it is mounted on a machine, one or more of its optoelectronic components can be arranged to face each other, on both sides of the fruit-bearing hedgerow and spanned by it, the device comprising a system for electronic analysis programmed or configured in order to handle the information generated by the blockage of the light, in order to visualize the elements of the hedgerow, whereby this can be done either during the day or at night.

Other advantageous characteristic arrangements of the process and device of the invention are expressed in the dependent claims and described in the following description.

The process and device for mobile scanning according to the invention generally have the advantages, notably in their application to the operation and the equipment of vine pre-pruning machines:

of allowing the detection of the stakes regardless of their composition (wood, metal, plastic), their geometry (L-shaped, T-shaped, round, angled), their diameter (generally between 20 and 250 mm), as well as automatic opening of the pre-pruning head for passage of the stakes, in thus relieving the driver from a repetitive task that requires a large amount of attention, in particular, when the stakes are made of angled iron; of reducing the quantity of vineshoots left around the stakes relative to the machine operating by manual opening;

preventing the damage to the stakes or the tools of the machine;

preventing damage to the cordon and undesired elimination of the fruit; allowing work at greater movement speeds for the machine; allowing an automatic measurement of the health status of each vine base.

In the application of the invention to the measurement of the vine base, it is understood that each optical barrier that intersects the passage of the pruning wood will generate a signal that makes it possible to determine the cross-section of the vineshoots that cut this barrier. In providing a relatively sizeable number of superposed optical barriers, it is possible to obtain an interesting estimate of the surface of the vineshoots that are cut by the optical barriers.

The correlation tables were made in order to correspond to the cut sections, one health status, and for each vine base. This correlation allows an estimate of the health status with a precision on the order of 8%, which is largely sufficient in order to orient the pruning and thus to determine the number of fruit to be protected per vine base.

According to the invention, the information communicated by the artificial vision system is transmitted to a computer or an on-board calculator in which are recorded, with a large amount of precision, the geographic coordinates of each vine base obtained by GPS, and which makes it possible to record, on the corresponding database, the health status during the operation of pre-pruning. The information could be used purposefully by the wine-grower in order to optimize the pruning and fertilization of his vine.

The pruning adapted to the fertility, must allow an optimum harvest from the perspective of weight, sugar and acidity, and thus provides the wine-growers with the possibility to have a high-quality raw material for vinification, necessary to develop a great vintage.

BRIEF DESCRIPTION OF THE SEVERAL VIEWS OF THE DRAWINGS

The purposes, characteristics, and advantages above, and others, are better understood in the description that follows and the attached drawings.

DETAILED DESCRIPTION OF THE INVENTION

Reference is made to the drawings to describe examples that are of interest, though in no way restrictive, for operating the process and embodiments of the device for analysis of the structure of fruit-bearing hedgerows according to the invention.

This device comprises an artificial vision system (FIG. 1) functioning by direct transmission and comprising, on the one hand, at least one emitter module EM comprising at least one, and preferably, many emitters of light beams E (E1, E2, E3 ... ), and, on the other hand, at least one receiving module RM comprising at least one, and preferably, many receivers of light beams R (R1, R2, R3 ... ). In an advantageous manner, this artificial vision system is comprised of infrared emitters and receivers, and more specifically, near-infrared emitters and receivers.

Figure 2:
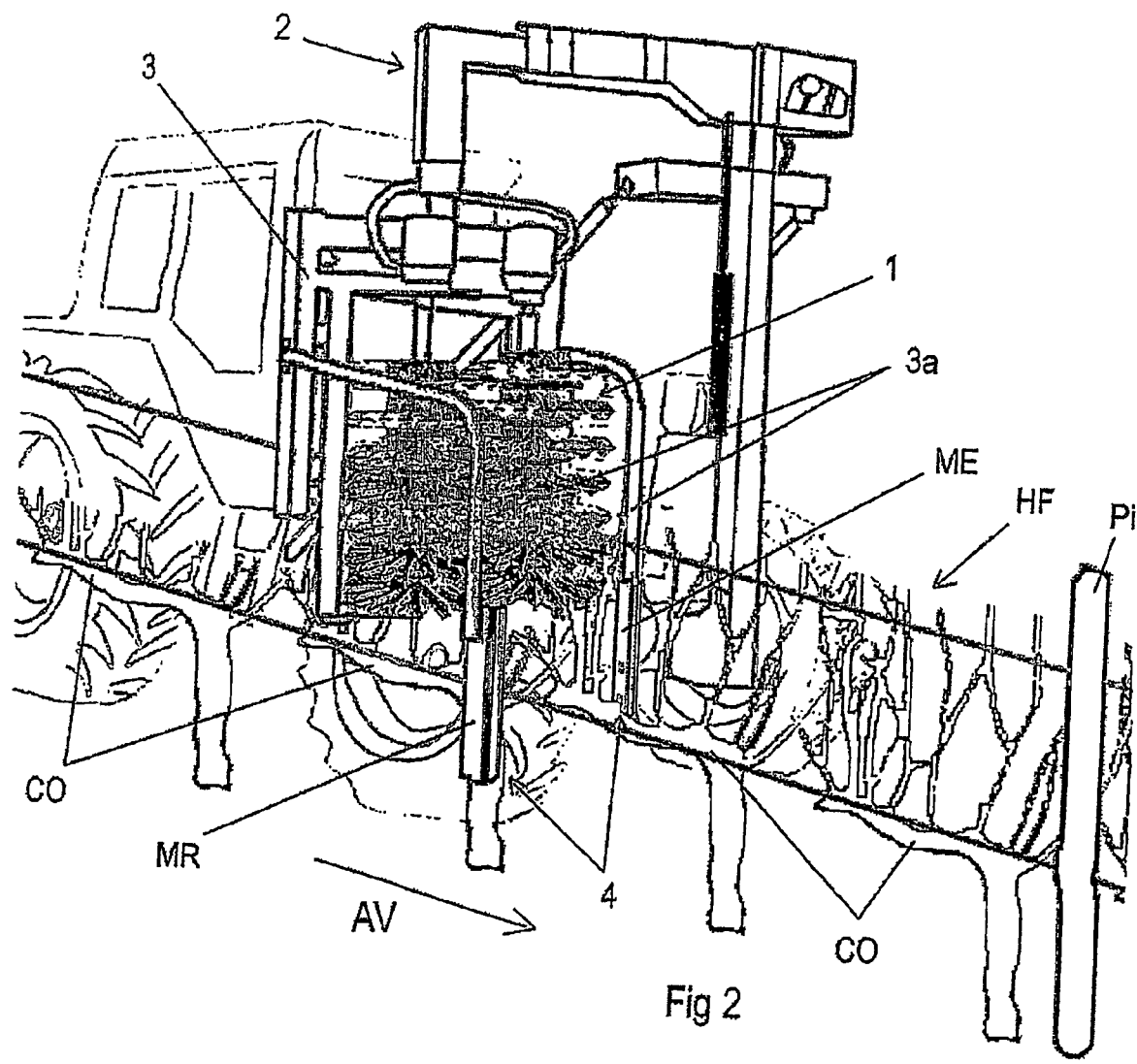
FIG. 2 is a perspective view showing a pre-pruning machine equipped with a system for artificial vision, moving over a vine row.
Figure 3:
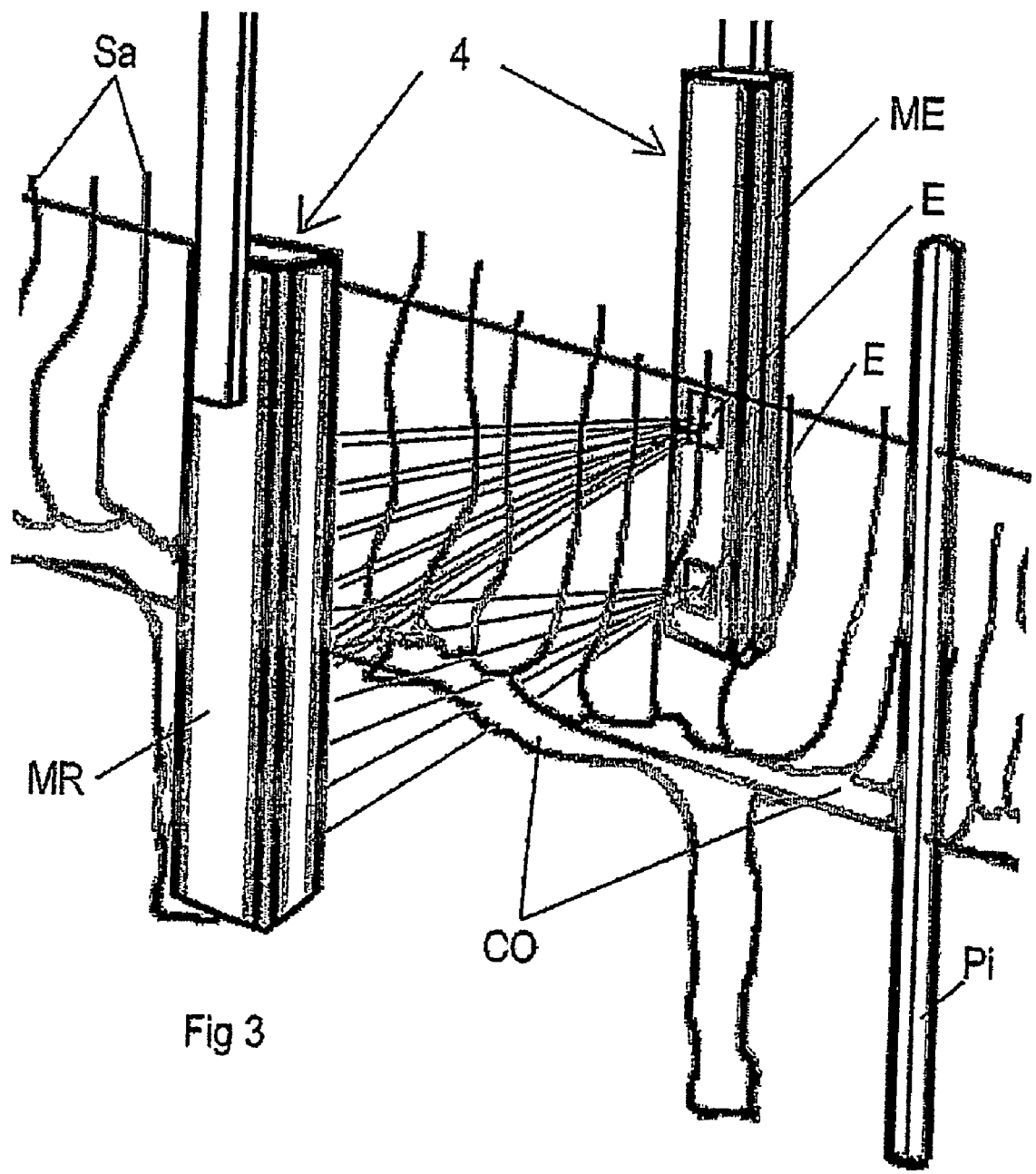
FIG. 3 is a detailed perspective view of FIG. 2.

Preferably, installed in front of the operating head of the agricultural machine, i.e. the cutting head 1 for pre-pruning 2 (FIG. 2), for example, of the type described in the document EP-0 312 126 or in the document FR-2 576 481.

The emitter module EM and receiving module RM are arranged at a distance from each other, for example, at a distance on the order of 800 mm, so as to be able to be placed facing each other, on either side of the fruit-bearing hedgerow HF (FIGS. 2 to 5) when the machine moves along the hedgerow. They are affixed on the vertical elements 3a of the chassis of the machine using mechanisms, themselves known from the prior-art, that allow the adjustment of the their position, mainly the height, relative to the chassis.

Figure 1:
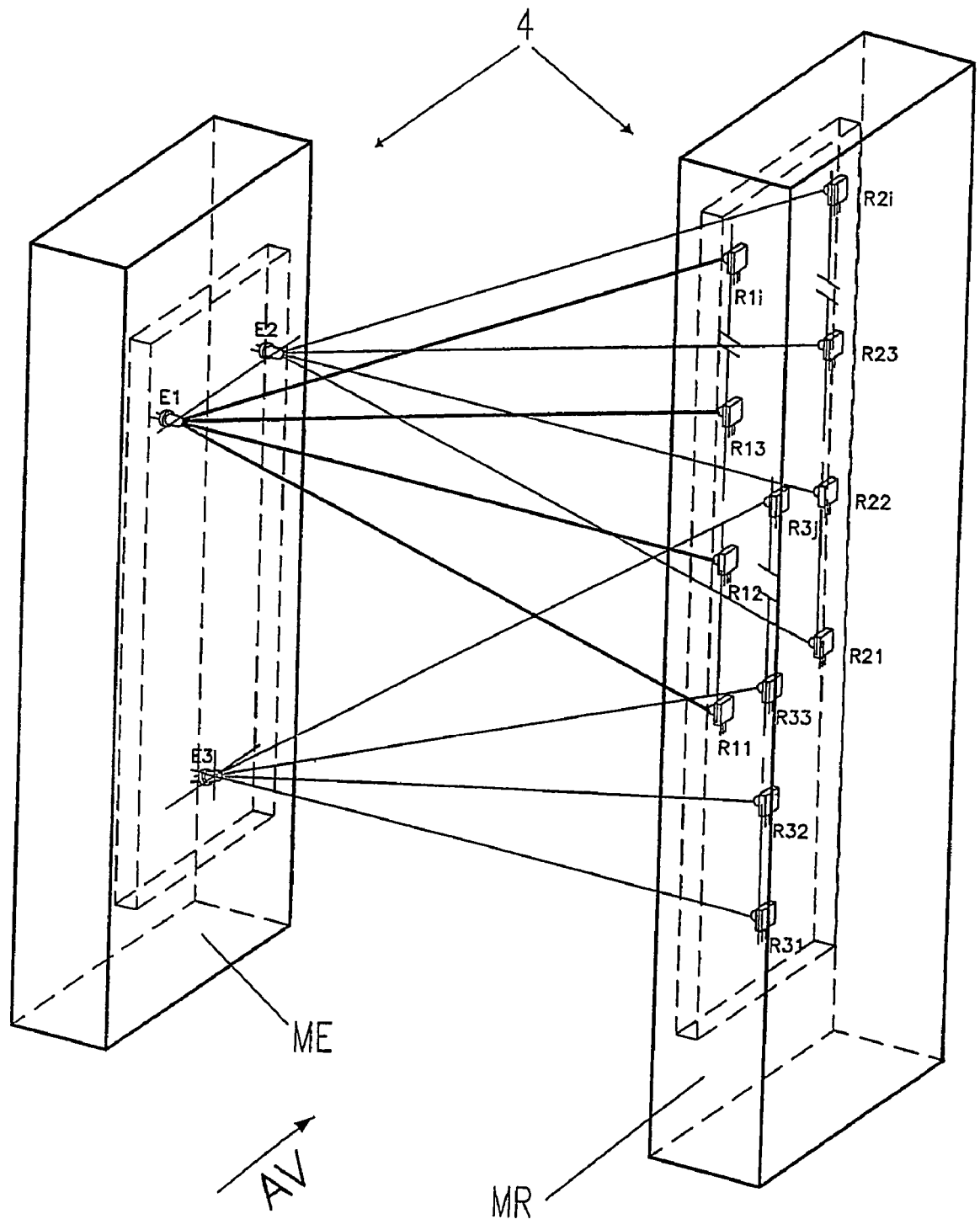
FIG. 1 is a schematic view of a configuration example for artificial vision of the invention.

According to the configuration example of the vision system 4 shown in FIG. 1:
  the emitter module comprises, on the one hand, in its upper part, two separated emitters aligned horizontally which are named, respectively, front emitter E1 and rear emitter E2, following the description, and on the other hand, in its lower part, an emitter E3; the space "e" separating the emitters E1 and E2 is determined to be lower than the width of the smallest stakes Pi used for the paling of the fruit-bearing hedgerows HF, this space "e" being, for example, on the order of 20 mm;
  the receiver module comprises three vertical rows or columns of receivers that are named, respectively, front row (receiver R11, R12, R13, ... R1i), rear row (receivers R21, R22, R23, ... R2i) and intermediate row (receivers R31, R32, R33, ... R3j), the lower receiver R31 of the intermediate row being placed on the lower part of the receiver module.

The vertical rows or columns of receivers can comprise, each one, a relatively sizeable number of receivers. For example:
  the front vertical row R11, R12, R13, ... can be comprised of twelve receivers;
  the rear vertical row R21, R22, R23, ... can also be comprised of twelve receivers;
  the third row of receivers R31, R32, R33, ... can be comprised of thirteen receivers.

The receivers of each of the three vertical rows can be spaced at a distance that can be between 20 mm and 40 mm in the vertical direction.

The third row R31, R32, R33, ... occupies an intermediate position in the example shown in FIG. 1, but it can occupy a different position relative to the two others, in the artificial vision system.

Of course, the vision system could comprise a different number of emitters and receivers otherwise subdivided. It would be, for example, possible to create a vision system in the form of two modules comprising at the same time one or more emitters and one or more receivers, each emitter emitting signals that are only received by the receivers oriented to the emitters.

In an advantageous manner, the base light beam is composed by infrared emitters and receivers or near-infrared radiation.

According to the invention, the constraint of interfering light is eliminated by using light periodically modulated by the emitters, the receivers only being sensitive to the modulated light and not the continuous component of the light.

Sunlight, which is a source of interference for our vision system, is noticeably attenuated by the atmosphere above 750 nm, i.e. in the infrared range, with an absorption peak around 950 nm. So that the beam coming from the vision system can be distinguished from the sunlight, it is advantageous to use a light beam near 950 nm. Thus, for each emitter, an infrared diode has been selected which emits light of wavelength 950 nm when a current goes through it. This diode is excited by a periodic electric signal corresponding to a frequency called "modulation frequency". The modulation frequency can be fixed in the range between 30 and 56 kHz.

Each receiver R (photo-receiver model TSOP by Vishay Telefunken) is sensitive to any incident beam having a wavelength around 950 nm. It provides, at the output, an active electric signal only if the modulation frequency of the incident beam corresponds to its own frequency. All interfering light sources (sun, incandescent or fluorescent lights) that, by nature or by construction, are not modulated at this frequency, do not give an active signal at the output of the photo-receptor module and are thus integrally filtered.

Each emitter E1 (front), E2 (rear) emits, in an alternating manner, for a duration on the order of 500 µs, a modulated light, for example, at a frequency of approximately 32 kHz. This frequency is the frequency that matches the receivers. The front row of receivers R11, R12, R13 ... R1i only accepts the signals coming from the front emitter E1, while the rear row of receivers R21, R22, R23, ... R2i only accepts the signals from the rear emitter E2.

On the other hand, the intermediate row of receivers R31, R32, R33, ... R3j only accepts signals coming from the lower emitter E3, designed in order to emit, for example, every 500 µs, a light modulated at a frequency corresponding to the frequency that matches the receivers of the third vertical row R31, R32, R33, .... Each receiver supplies an inactive state corresponding to a non-blocked beam and thus the absence of the obstacle between emitter and receiver. Conversely, when it is not excited by an incident ray, it provides an active state corresponding to the presence of an obstacle between emitter and receiver.

According to the invention, blockages of light are handled by an electronic system for analysis programmed or configured in order to visualize the elements of the structure of a fruit-bearing hedgerow or trained hedgerow:
  in order to measure the speed of motion of the machine; and/or
  in order to discriminate the stakes of the hedgerow; and/or
  in order to detect the position of the cordon; and/or
  in order to perform a measurement of the health status of the plants.

The electronic system for analysis 7 is comprised:

of an electro-distributor 9 for control of the valve 6 that ensures the forward or backwards movements for the pruning assemblies 14;

of the flow-regulation valve 11 of the hydraulic circuit for supplying the hydraulic motors 12 ensuring the rotary drive of the pruning assemblies 14;

of the electronic distributor 16 of the control valve 17 that ensures the vertical movements of the pruning assemblies 14;

of the precision wine-growing computer (not shown) capable of generating data for determining the health status of the plants.

Figure 4:
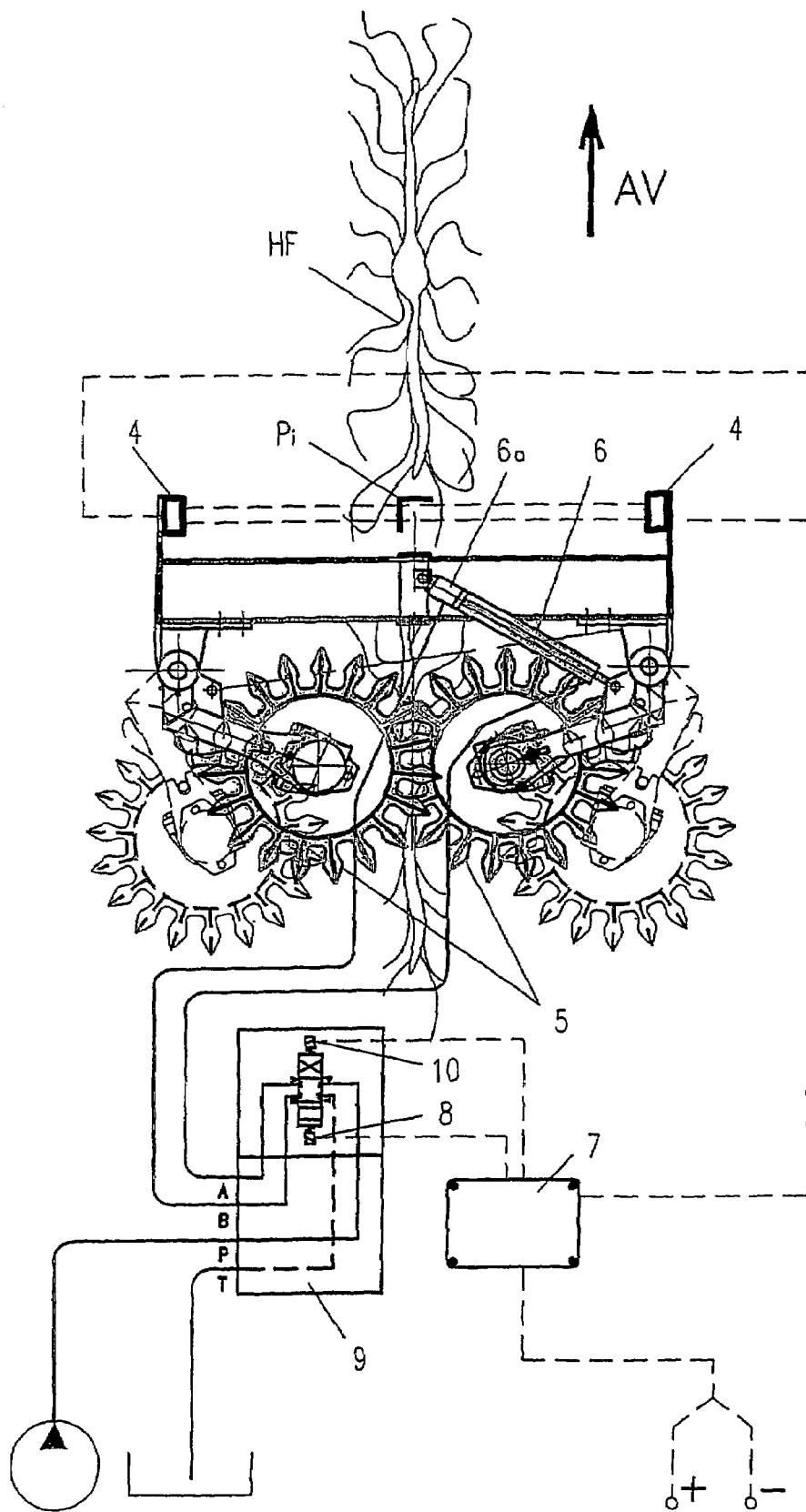
FIG. 4 is a schematic view of the device ensuring the opening and closing of the cutting head of the machine for passage of the stakes.

FIG. 4 shows the artificial vision system 4-4 installed in front of the cutting head of the pre-pruning machine in which can be seen, notably the rotary pruning elements 5 and the hydraulic valve 6 ensuring that they are brought together into operating or separation position for the passage of stakes Pi.

The artificial vision system 4-4 arranged on both sides of the fruit-bearing hedgerow (vine row or other) moves along the row (according to the arrow AV) which produces information which is analyzed by an electronic system 7 in order to discern the stakes Pi of the hedgerow, to define their width and the speed by which they are passed in front of the vision system 4-4. Once this information has been defined, the electronic system calculates:

1) the moment when it must send an electric current to the control 8 of the electronic distributor 9 that allows the passage of hydraulic fluid into the rear chamber 6a of the valve 6 which, using a mechanical transmission, ensures the opening or separation of the pruning instruments 5 for the passage of a stake Pi;

2) the moment when it must send an electric current to the control 10 of the electronic distributor 9 allowing the passage of hydraulic fluid to the front chamber of the valve 6, which ensures via a mechanical transmission the closing or bringing together of the pruning elements 5 after passing a stake.

The calculation thus makes it possible to separate and return the pruning instruments as near as possible to the stakes of the fruit-bearing hedgerows without touching them in order to not damage any of them, while moving away from the uncut vineshoots as little as possible.

Figure 5:
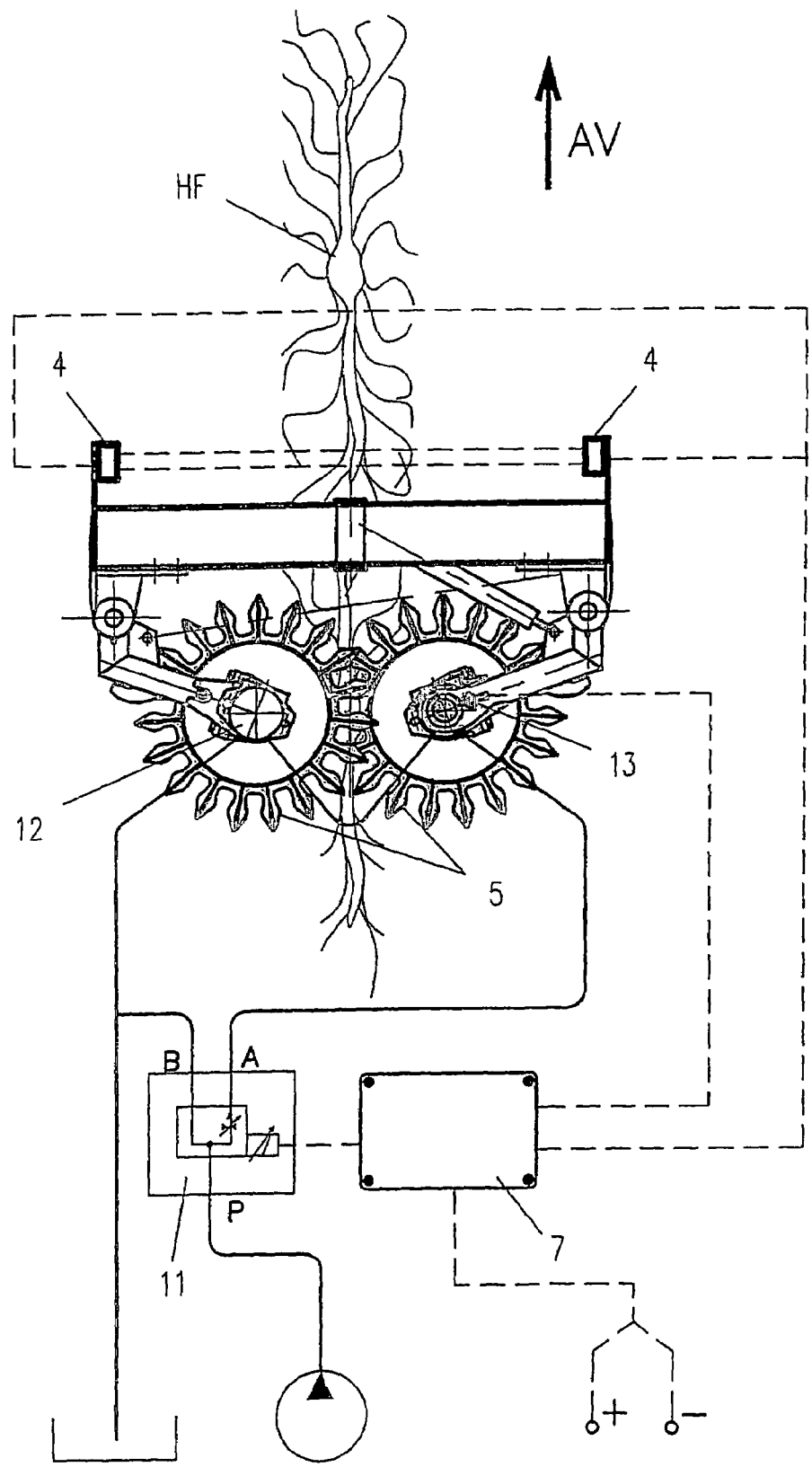
FIG. 5 is a schematic view of the device ensuring the regulation of the rotational speed of the rotary tools of the machine as a function of the machine's movement speed.

FIG. 5 is a view similar to FIG. 4 showing the application of the process and device of the invention for the measurement of the speed of movement of the machine and for the adjustment of the rotational speed of the pruning tools of the cutting head of the machine as a function of the measured speed of movement.

In this application, the artificial vision system 4-4 arranged on both sides of the fruit-bearing hedgerow HF moves along the row (according to arrow AV) producing information which is analyzed by an electronic system 7 in order to determine the speed of movement of the machine equipped with the vision system. When the electronic system has defined the speed of movement, it sends an electronic command to the speed control valve 11 which allows hydraulic oil to flow through to supply the hydraulic motors 12 which, by a mechanical linkage, drives in rotation the rotating instruments 5 of the pruning instruments. The electronic command is adjusted until a rotational speed sensor 13 affected by the measurement of the rotation of the rotary instruments 5 indicates to the electronic system 7 a rotational speed has developed that is near the speed of movement of the machine. This movement makes it possible to create feedback by closed loop with the electronic analysis system in order to adjust the rotational speed of the rotary tools 5 as a function of the speed of movement of the machine 2.

Figure 6:
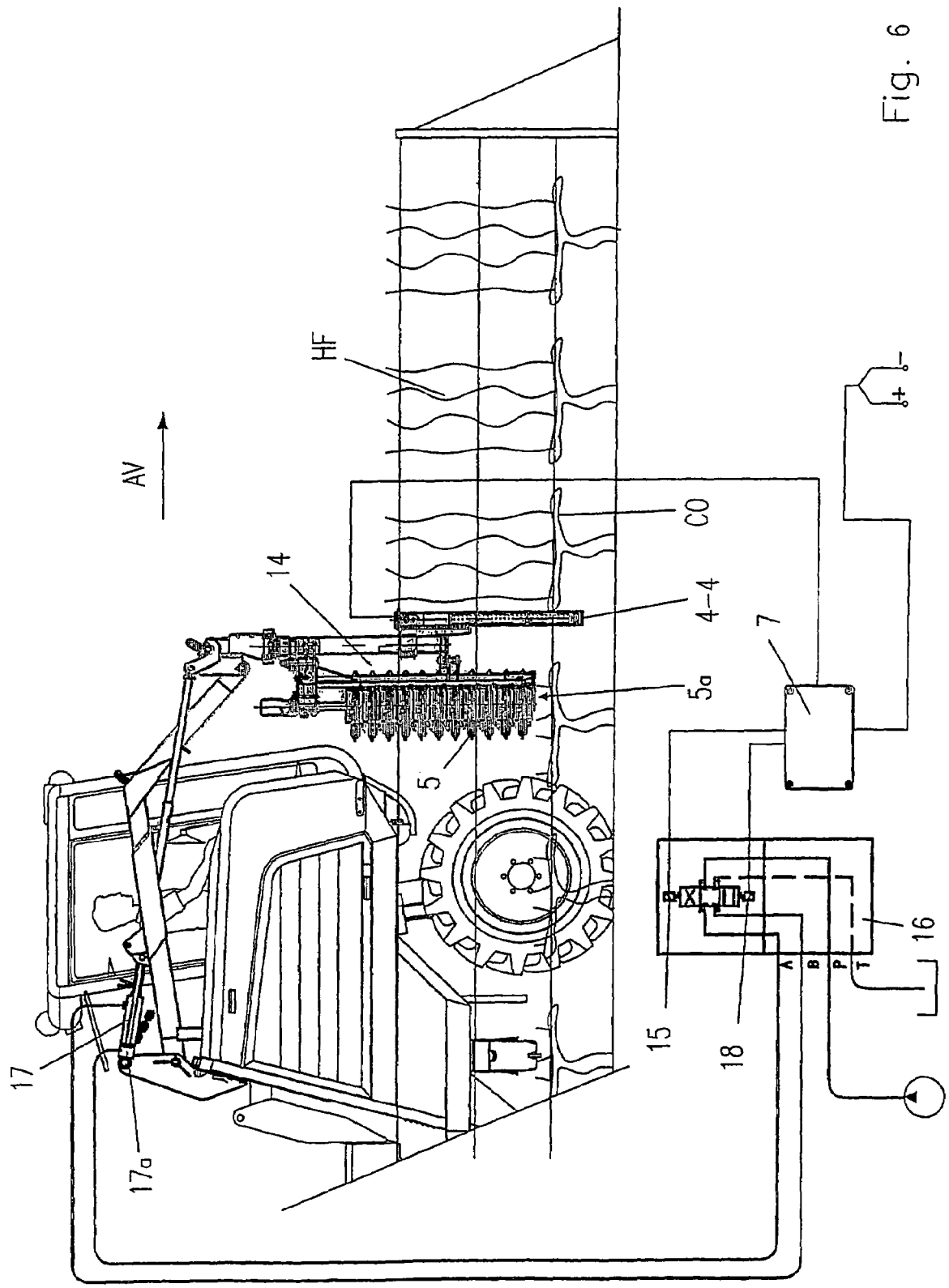
FIG. 6 is a schematic view of the device ensuring the positioning of the cutting head of the machine as a function of the position of the cordon of the vine row.

FIG. 6 shows the adjustment of the position of the pruning assembly of the machine relative to the cordon of the staked, cordon-trained vine rows.

The artificial vision system installed in front of the pruning assembly of the machine is made from two columns 14 of rotary tools 5. The system arranged on both sides of the vine row HF moves along it (in the direction of the arrow AV) producing information which is analyzed by an electronic system 7 in order to recognize and determine the position of the cordon Co relative to the pruning assemblies 14. Once this analysis is done, the electronic system 7 sends a current:

1/ i.e. if the cordon Co is very low relative to the cutting assemblies 14, to the command spool 15 of an electronic distributor 16 that allows hydraulic fluid to flow through to the rear chamber 17a of a valve 17 that uses a mechanical action to lower the cutting assemblies 14 until the cordon is recognized and found at the desired position relative to the cutting assemblies;

2/ or, if the cordon Co is very high relative to the cutting assemblies 14, to the command spool 18 of an electro-distributor 16 that allows the passage of hydraulic fluid to the front chamber of the valve 17 which, by a mechanical action, makes the cutting assemblies 14 return upwards until the position of the cordon Co relative to the cutting assemblies is correct.

The desired initial position of the cutting assemblies 14 relative to the cordon Co is fixed in advance. This advanced positioning is done by an adjustment of the position of the emitter module ME and receiving module WIR of the vision system 4-4 relative to the cutting assemblies 14 using a device for adjustable fixation of the modules on the elements 3a of the chassis 3 of the machine, as indicated above.

In the following, the function of the artificial vision system is described in the different applications of the invention.

A—Discrimination of the Stakes from the Vegetation

Figure 7A:
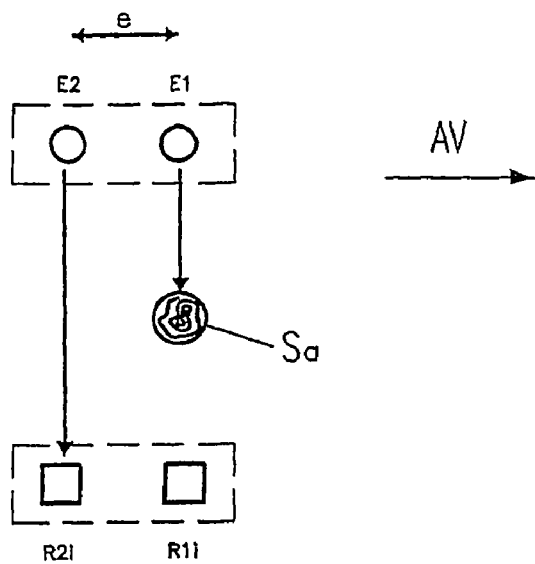
FIGS. 7A, 7B, and 7C are schematic views showing the process for identification of the vineshoots by the artificial vision system.
Figure 7B:
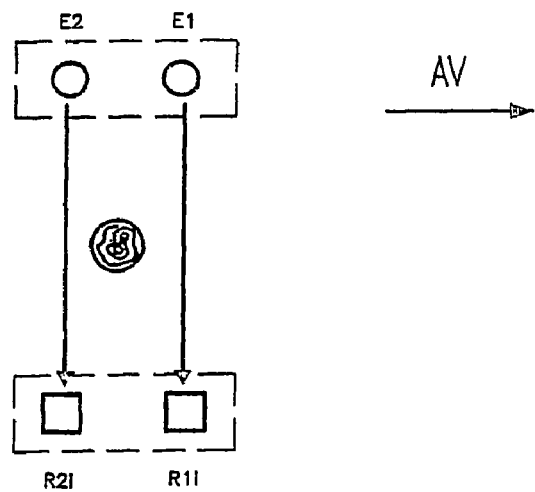
Figure 7C:
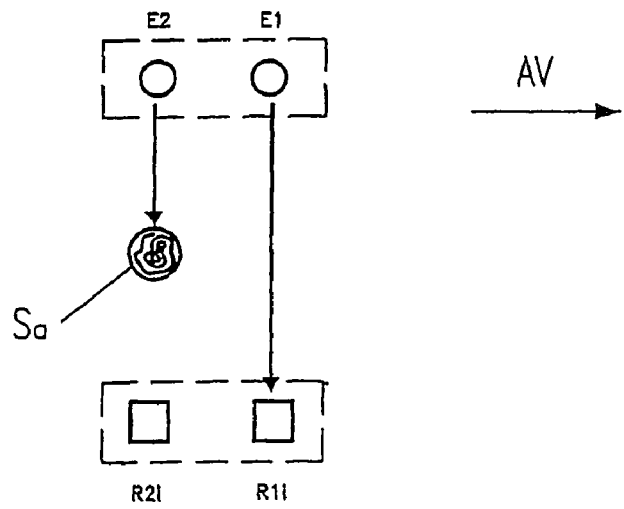

A.1 Identification of the Vegetation (FIGS. 7A, 7B, and 7C)

Taking into account the fact that the process and the device of the invention are most especially designed to equip machines designed to move in the vines, the following description uses the term "vineshoot" to describe the vegetation, this word, however, must be considered as the equivalent of the term "branch" which generally designates the small branches of the plants or shrubs.

A vineshoot Sa has a diameter less than the distance "e" between the emitters E1 and E2. It cuts in sequence the beam E1-R1i then the beam E2-R2i.

When the machine moves (arrow AV), the sequence of events for characterizing the presence of a vineshoot is the following:

a) the vineshoot Sa cuts the beam E1-R1i (FIG. 7A)
b) the vineshoot does not cut any beam (FIG. 7B)
c) the vineshoot cuts the beam E2-R2i (FIG. 7C).

Figure 8A:
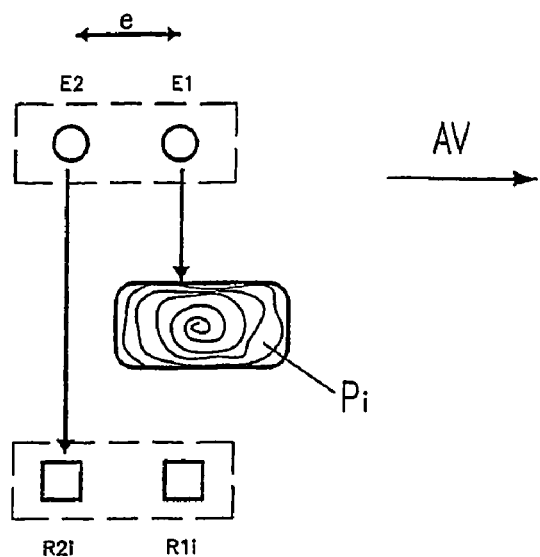
FIGS. 8A, 8B, and 8C are schematic views showing the process for identification of the stakes by the artificial vision system.
Figure 8B:
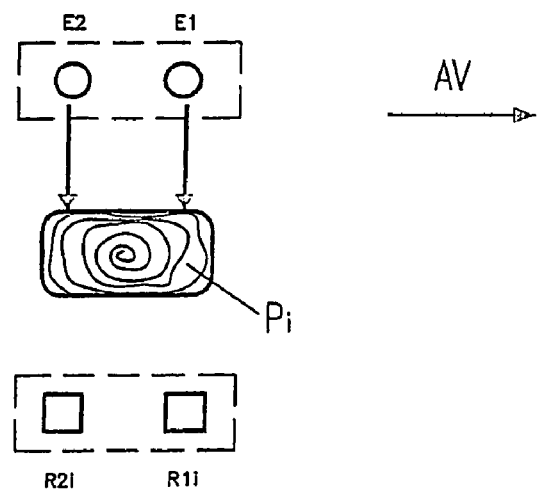
Figure 8C:
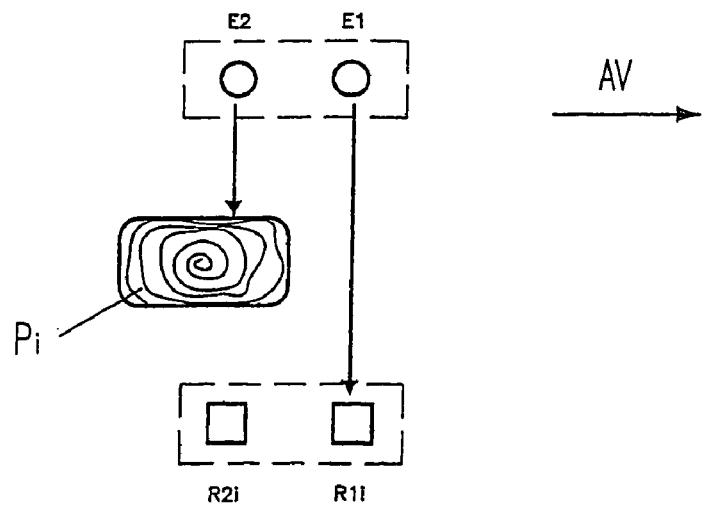

A.2 Identification of a Stake (FIGS. 8A, 8B, and 8C).

A stake Pi has an apparent width greater than the distance "e" arranged between the emitters E1 and E2. It simultaneously cuts the beams E1-R1i and E2-R2i.

When the machine moves, the sequence of events for characterizing the presence of a stake is the following:

a) the stake Pi cuts only the beam E1-R1i (FIG. 8A)
b) the stake cuts the beams E1-R1i and E2-R2i (FIG. 8B)
c) the stake cuts only the beam E2-R2i (FIG. 8C)

Figure 9A:
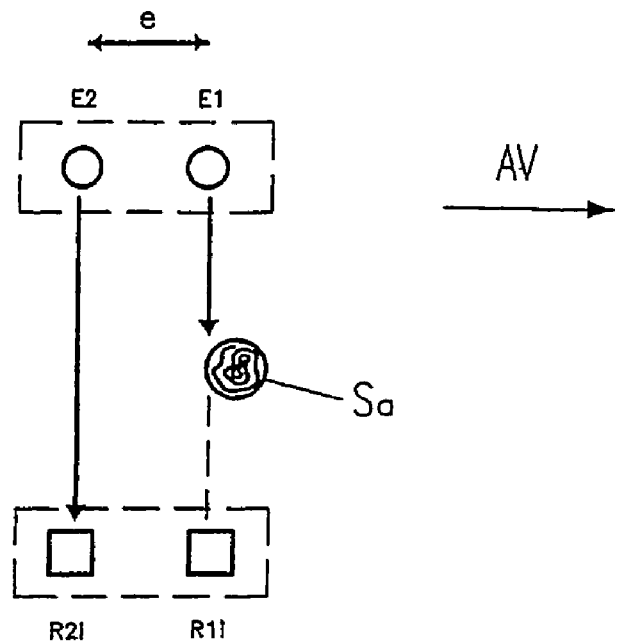
FIGS. 9A and 9B are schematic views showing the process for measurement of the movement speed of the machine by the artificial vision system.
Figure 9B:
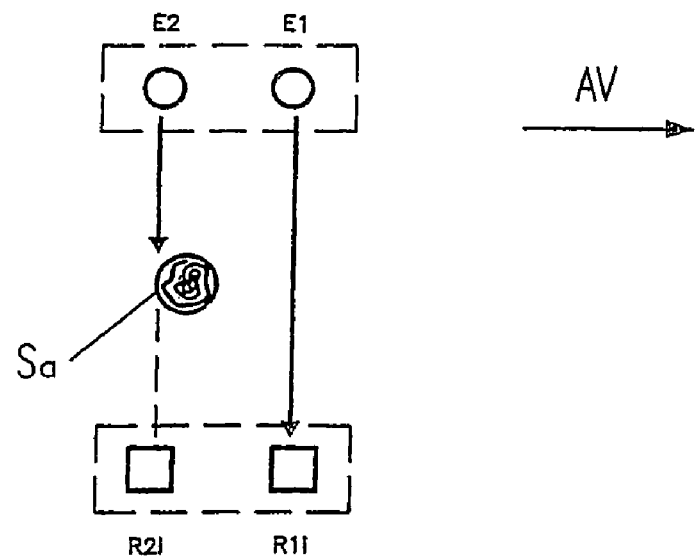

B—Measurement of the Speed of Movement of the Machine (FIGS. 9A, 9B)

The speed of movement of the machine is measured on the vegetation and on the stakes.

B.1 Measurement of the Speed on the Vegetation
  a) at the moment t1, the vineshoot Sa cuts the beam E1-R1i (FIG. 9A)
  b) at the moment t2, the vineshoot cuts the beam E2-R2i (FIG. 9B)
Between t1 and t2, the machine has traveled the distance e. The speed of movement V of the machine will be e/(t2−t1)

B.2 Measurement of the Speed on the Stakes.
The measurement of the speed on the stakes is done in the same manner as the measurement of the speed on the vegetation.

Figure 10A:
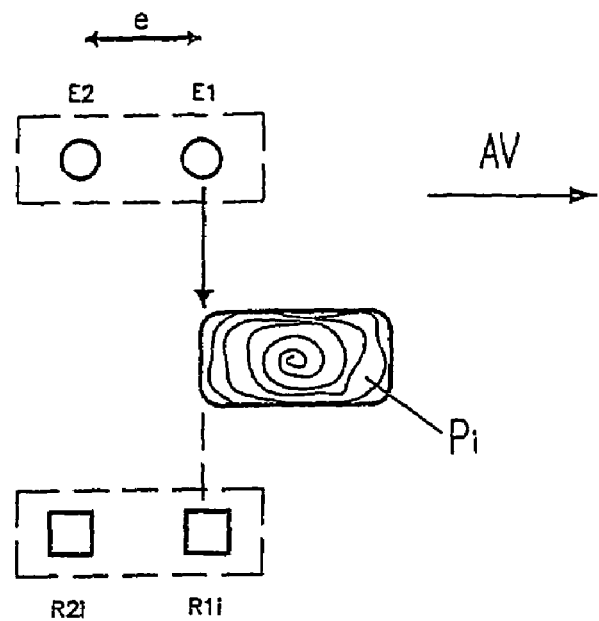
FIGS. 10A and 10B are schematic views showing the process for measurement of the width of the stakes by the artificial vision system.
Figure 10B:
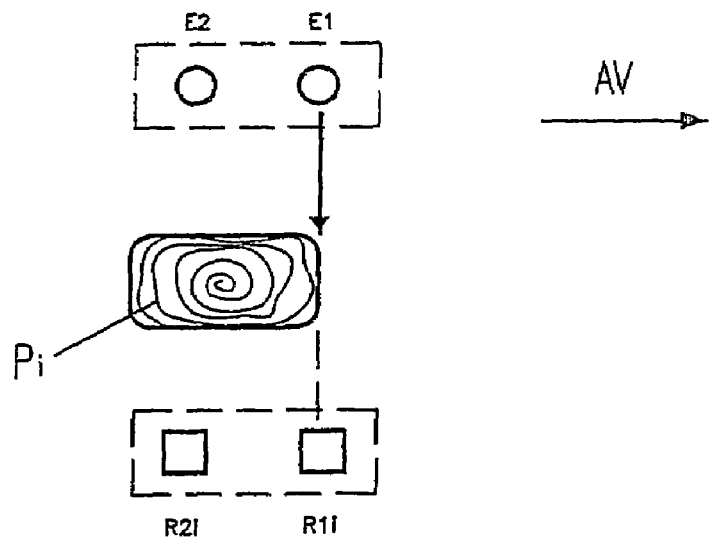

C—Measurement of the Apparent Width of the Stakes (FIGS. 10A and 10B).
The speed of movement V of the machine is known and a stake Pi has been identified in traversing as shown above.

C.1 Measurement of the Width of the Stake with the Front Beam E1-R1i
  a) at the moment t1, the stake Pi begins to cut the beam E1-R1i (FIG. 10A)
  b) at the moment t2, the stake stops cutting the beam E1-R1i (FIG. 10B).
Between the moment t1 and t2, the machine has traveled the distance L at speed V. The width of the stake Pi will be L=(t2−t1)*V.

C.2 Measurement of the Width of the Stake with the Rear Beam E2-R2i.
The width of the stake is measured in the same manner as above with the rear beam E2-R2i.

Figure 11A:
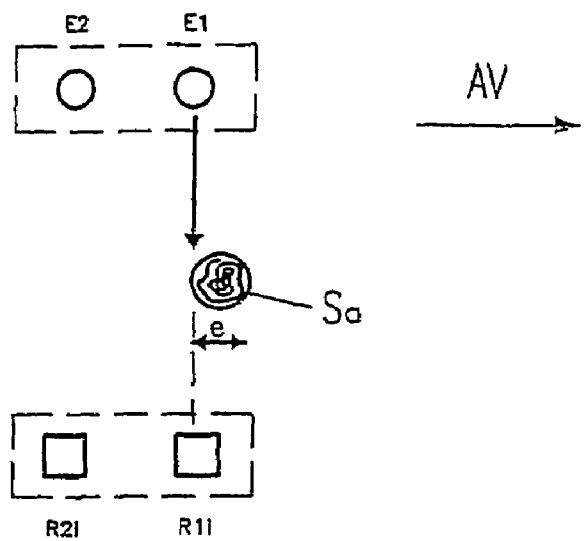
FIGS. 11A and 11B are schematic views showing the process for measurement of the diameter of the stakes by the artificial vision system.
Figure 11B:
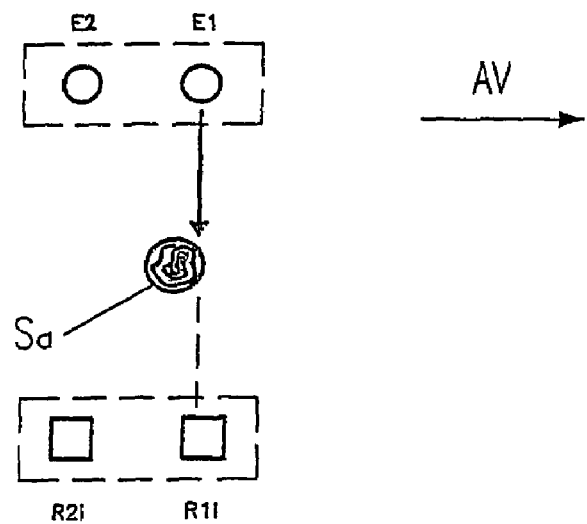

D—Measurement of the Health Status of the Vegetation (FIGS. 11A, 11B).
The measurement of the diameter of all of the vineshoots at a height corresponding to that of the vertical rows of front receivers R11-R1i and rear receivers R21-R2i, makes it possible to deduce the health status of the vegetation, using a correlation table.

The movement speed V of the machine is obtained and a vineshoot Sa is identified by proceeding as indicated above.

D.1 Measurement of the Diameter of the Vineshoot with the Front Beam E1-R1i:
  a) at the moment t1, the vineshoot Sa begins to cut the beam E1-R1i (FIG. 11A)
  b) at the moment t2, the vineshoot stops cutting the beam E1-R1i (FIG. 11B).
Between the moment t1 and the moment t2, the machine has traveled a distance d at a speed V. The Diameter of the Vineshoot will be d=(t2−t1)*V.

D.2 Measurement of the Diameter of the Vineshoot with the Rear Beam E2-R2i.
The diameter of the vineshoot is measured in the same manner as above, with the rear beam E2-R2i.

E—Measurement of the Position of the Cordon Relative to the Lower Cutting Tool Sa of the Cutting Assembly of the Machine.

E.1 Identification of the Cordon (FIG. 12)
The cordon Co is distinguished from a stake or from a vineshoot in that it blocks one or more beams E3-R31, E3-R32, E3-R33 . . . in the same way when the machine is moving forward.

E.2 Position of the Cordon Relative to the Lower Tool.
Considering that according to a preferred construction,
  the horizontal lower beam E2-R31 defines the position of the null reference;
  the cordon Co is located halfway between the emitter module ME and the receiver module MR (cutting tool centered on the vine row);
  the emitter module ME and receiver module MR are united with the cutting assembly 14;
  the receivers R31, R32, R33, R3j are spaced vertically at the same distance h.

Figure 12:
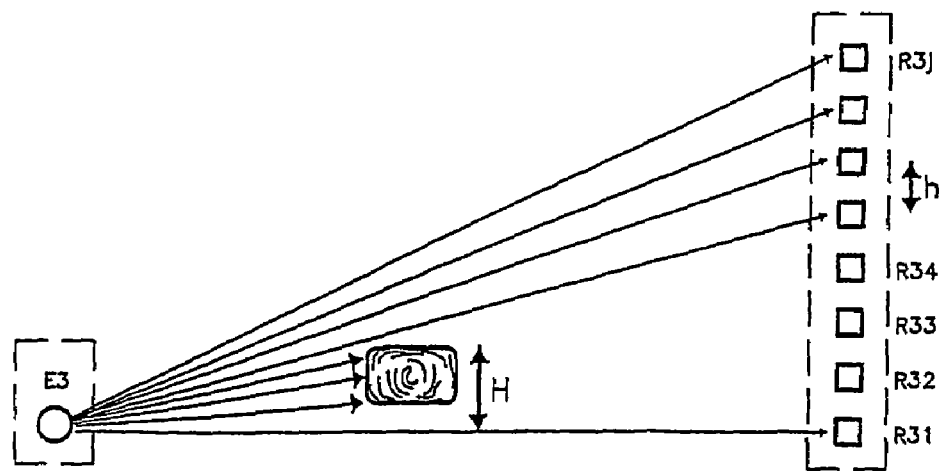
FIG. 12 is a schematic views showing the process for measurement of the position of the cordon by the artificial vision system.

The position of the height of the cordon is given by the highest beam that is blocked (the beam having index k=4 in the example shown in FIG. 12).

The height of the top of the cordon, relative to the reference beam E3-R31 is equal to: H=(k−1)*h/2.

I claim:

1. A system for analyzing a cultivated hedgerow comprising:
  a machine having a motor and wheels and a working head, said motor being drivingly connected to said wheels so as to cause said machine to move along the cultivated hedgerows; and
  an artificial vision system mounted to said machine forwardly of said working head, said artificial vision system comprising:
    at least one light emitter positioned so as to be on one side of the cultivated hedgerow;
    at least one light receiver facing the emitter and positioned so as to be on an opposite side of the cultivated hedgerow, the light emitter directly transmitting light toward the light receiver; and
    a processing means connected to the light emitter and to the light receiver, said processing means for analyzing blockages of light occurring between the light emitter and the light receiver so as to produce an output relative to a structure of the cultivated hedgerow.

2. The system of claim 1, the light emitter suitable for emitting periodically modulated light, the receiver being sensitive only to the periodically modulated light.

3. The system of claim 1, the light emitter emitting light of either less than 400nm or of more than 750nm.

4. The system of claim 1, the light emitter comprising a front emitter positioned forwardly of a rear emitter, the light receiver comprising a front receiver positioned forwardly of a rear receiver, the front and rear emitters alternately emitting a modulated light at a frequency matching said front and rear receivers respectively.

5. The system of claim 1, said machine having rotary tools, said processing means for measuring a speed of the movement of said machine, said processing means cooperative with said rotary tools for adjusting a rotational speed of said rotary tools relative to the speed of movement of said machine.

6. The system of claim 1, said processing means for determining a position of a stake of the cultivated hedgerow.

7. The system of claim 1, said processing means for determining a position of a horizontal support.

8. A system for analyzing a staked cultivated hedgerow comprising:
  a machine having a working head mounted forwardly thereof;
  an artificial vision system interconnected to said machine forwardly of said working head, said artificial vision system comprising:
    at least one light emitter positioned so as to be on one side of the cultivated hedgerow;
    at least one light receiver facing the emitter and positioned so as to be on an opposite side of the cultivated hedgerow, the light emitter directly transmitting light toward the light receiver;
    a processing means connected to the light emitter and to the light receiver, said processing means for analyzing blockages of light occurring between the light emitter and the light receiver so as to produce an output relative to a structure of the cultivated hedgerow.

9. The system of claim 8, said artificial vision system further comprising:
- an emitter module having the emitter affixed thereto, the light emitter having a front emitter and a rear emitter with a horizontal distance therebetween being less than a width of the stake; and
- a receiver module having the light receiver affixed thereto, the light receiver having a front receiver and a rear receiver.

10. The system of claim 9, said receiver module having a first vertical row having the front receivers and a second vertical row having the rear receivers, said front emitter and said rear emitter suitable for alternately emitting modulated light at a frequency matching a receiving frequency of said front receivers and said rear receivers.

11. The system of claim 10, said receiver module having a third vertical row of intermediate receivers, said intermediate receivers having a lowermost receiver adjacent a lower part of said receiver module, said emitter module having a lower emitter positioned adjacent lower part of said emitter module, said lower emitter suitable for emitting light at a frequency matching a receiving frequency of said intermediate receivers.

12. The system of claim 9, said machine having a chassis, said receiver module and said emitter module being height-adjustably affixed to said chassis.

13. The system of claim 8, said processing means for using the blockage of light to produce a measurement of a speed of said machine.

14. The system of claim 8, said processing means for measuring using blockage of light so as to detect a position of the stake.

15. The system of claim 8, said working head being a cutting head with pruning elements thereon, said pruning elements being movable between a first position and a second position, said processing means being connected to an electro-distributor of a control valve connected to said cutting head for moving said pruning elements between said first and second positions.

16. The system of claim 15, said cutting head being vertically-adjustably mounted to said machine, said processing means connected to an electronic distributor of a control valve so as to cause said control valve to raise or lower said cutting head or the pruning elements thereon.

17. The system of claim 8, said machine having a hydraulic motor drivingly connected to a rotary cutting tool, said processing means connected to a flow regulation valve of said hydraulic motor, said processing means connected to a rotation sensor for sensing a speed of rotation of said rotary cutting tool, said processing means for controlling the speed of rotation of said rotary cutting tool relative to a speed of movement of said machine.

* * * * *